US012006760B2

(12) United States Patent
Pipkins et al.

(10) Patent No.: US 12,006,760 B2
(45) Date of Patent: Jun. 11, 2024

(54) AUTOMATIC DOOR WITH BIASED OPEN AND MANUALLY CLOSED EXTERNAL PARTIAL DOOR

(71) Applicant: ASSA ABLOY Entrance Systems AB, Landskrona (SE)

(72) Inventors: Charles Alan Pipkins, Indian Trail, NC (US); Christopher B. Gilbert, Harrisburg, NC (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 0 days.

(21) Appl. No.: 17/955,799

(22) Filed: Sep. 29, 2022

(65) Prior Publication Data

US 2024/0110432 A1 Apr. 4, 2024

(51) Int. Cl.

*E06B 3/46* (2006.01)
*E05B 65/08* (2006.01)
*E05D 15/06* (2006.01)
*E05F 1/16* (2006.01)
(Continued)

(52) U.S. Cl.

CPC ............ *E06B 3/4636* (2013.01); *E05B 65/08* (2013.01); *E05D 15/063* (2013.01); *E05D 15/0656* (2013.01); *E05F 1/16* (2013.01); *E05F 15/73* (2015.01); *E06B 7/32* (2013.01); *E05Y 2201/47* (2013.01); *E05Y 2201/64* (2013.01); *E05Y 2201/684* (2013.01); *E05Y 2400/44* (2013.01);
(Continued)

(58) Field of Classification Search

CPC ..... E06B 3/4636; E06B 7/32; E05D 15/0686; E05D 15/063; E05F 17/2005; E05F 17/004

USPC ............................. 49/125, 366, 370; 52/207

See application file for complete search history.

(56) References Cited

U.S. PATENT DOCUMENTS

| | | | |
|---|---|---|---|
| 445,614 | A | 2/1891 | Mehay |
| 2,205,547 | A | 6/1940 | Stoner |
| 3,266,189 | A | 8/1966 | Eby |

(Continued)

FOREIGN PATENT DOCUMENTS

| | | | |
|---|---|---|---|
| CN | 110700722 | A | 1/2020 |
| GB | 2010382 | A | 6/1979 |

(Continued)

OTHER PUBLICATIONS https://web.archive.org/web/20210515142937/http://www.tormaxusa.com/en/87/tormax-service-slidingdoors.

(Continued)

*Primary Examiner* — Marcus Menezes
(74) *Attorney, Agent, or Firm* — Burr & Forman LLP

(57) ABSTRACT

A door assembly may include a first sidelite, a second sidelite where the first and second sidelites are disposed in a common plane and defining a door opening between the first and second sidelites, a first sliding panel, a second sliding panel where the first and second sliding panels are movable from a closed position disposing the first and second sliding panels to block access through the door opening and an open position in which the first sliding panel is proximate the first sidelite and the second sliding panel is proximate the second sidelite, and are disposed in a second plane parallel to the common plane in both the open and closed position, a first partial door panel disposed in a third plane opposite the second plate relative to the common plane, and a second partial door panel disposed in the third plane.

18 Claims, 9 Drawing Sheets

(51) Int. Cl.
*E05F 15/73* (2015.01)
*E06B 7/32* (2006.01)

(52) U.S. Cl.
CPC ..... *E05Y 2800/71* (2013.01); *E05Y 2900/132* (2013.01)

(56) References Cited

U.S. PATENT DOCUMENTS 3,318,047 A 5/1967 Carson
3,325,941 A 6/1967 Prucha
3,583,738 A 6/1971 Uphoff et al.
3,774,342 A * 11/1973 Thom ................... E05D 15/066 49/420
3,834,081 A 9/1974 Catlett
4,004,372 A * 1/1977 Beard ....................... E05F 1/16 49/404
4,063,388 A 12/1977 Little
4,438,594 A 3/1984 Bunzl
5,486,026 A 1/1996 Borgardt
5,762,123 A 6/1998 Kuyama et al.
5,884,683 A 3/1999 Sears
6,076,303 A 6/2000 Orsini
6,422,287 B1 7/2002 Wilke
7,296,608 B2 11/2007 Weishar et al.
9,637,970 B1 5/2017 Rendon et al.
10,280,678 B1 * 5/2019 Rendon, Jr. ............. E06B 3/509
11,713,616 B2 * 8/2023 Wolfe ..................... E05D 15/48 49/31
2001/0025450 A1 10/2001 Juntunen et al.
2004/0025455 A1 2/2004 Nubel et al.
2004/0160318 A1 * 8/2004 Sasaki ..................... G01S 13/04 340/522
2005/0028946 A1 2/2005 Weishar et al.
2005/0120631 A1 6/2005 Sanders
2005/0210752 A1 * 9/2005 Schulte ................... E05F 1/046 49/360
2006/0150512 A1 7/2006 Heithe et al.
2010/0242366 A1 9/2010 Liebscher et al.
2011/0072724 A1 3/2011 Scruggs
2011/0214350 A1 9/2011 Salvietti et al.
2012/0117881 A1 * 5/2012 Seymour ................. E05F 15/40 49/130
2012/0159851 A1 * 6/2012 Seymour ............... E06B 3/5072 49/177
2013/0160240 A1 * 6/2013 Kenny ...................... E05F 1/16 16/89
2014/0352220 A1 12/2014 Rees
2016/0356078 A1 12/2016 Macaraeg
2017/0074021 A1 * 3/2017 Rodems .................. E05D 15/06
2017/0275936 A1 * 9/2017 Wolfe ................ E05D 15/0656
2019/0360200 A1 11/2019 Sloss
2019/0360260 A1 11/2019 Hunter
2022/0290487 A1 9/2022 Martin

FOREIGN PATENT DOCUMENTS

WO 2017162803 A1 9/2017
WO 20180215931 A1 11/2018
WO 2021151579 A1 8/2021

OTHER PUBLICATIONS https://web.archive.org/web/20210625085555/https://www.fsrmagazine.com/content/tormax-createsspecially-engineered-sliding-door-systems.
https://www.facebook.com/watch/?v=816923339009783.
https://foursquare.com/v/chickfila/4ba42979f964a520e58738e3?openPhotoId=60d7ceda9bd21a6665bb1c13.
English Translation for CN 110700722.
International Search Report and Written Opinion of corresponding International Application No. PCT/EP2022/074091 dated Nov. 28, 2022, all pages in its entirety.
Signed and stamped engineering drawings entitled "Pass Through Gate Chick Fil-A" dated Dec. 2, 2020.
Signed and stamped engineering drawings entitled "Pass Through Gate Chick Fil-Å" dated Jan. 2, 2020.
An email dated Nov. 3, 2017 from Tormax to Chick-Fil-A that attaches a drawing of the TX9300 Chick-Fil-A Prototype.
A Proposal dated Apr. 26, 2019 from Tormax to Chick-Fil-A.
A completion form and photographs of a Tormax door dated Feb. 18, 2021.
International Search Report and Written Opinion of corresponding international application No. PCT/EP2023/075655 dated Jan. 5, 2024, all pages in its entirety.
Swedish Search Report of corresponding Swedish application No. 2230411-7 dated Apr. 19, 2023, all pages in its entirety.

* cited by examiner

AUTOMATIC DOOR WITH BIASED OPEN AND MANUALLY CLOSED EXTERNAL PARTIAL DOOR

TECHNICAL FIELD

Example embodiments generally relate to automatic doors and, in particular, relate to an automatic door with a biased open and manually closed partial door integrated therewith.

BACKGROUND

Automatic sliding doors are used in commercial and non-commercial settings in order to allow people and things to enter and exit a given area without having to open and close the door manually. Some sliding doors incorporate multiple panels, some of which may be fixed, while others slide to respectively open and close the door. In one common arrangement, a pair of fixed panels may lie in a common plane and be spaced apart from each other to define an opening in the common plane. Meanwhile, this pair of fixed panels may be located proximate to the left and right door jambs, respectively. A pair of sliding (or telescoping) panels may be aligned adjacent to, and in a plane (or planes) parallel to, the fixed panels when fully retracted. The sliding panels may then slide out of alignment with the fixed panels toward each other. When the sliding panels contact each other, the opening in the common plane of the fixed panels may be blocked by the sliding panels.

A sensor may be positioned on the inside and outside of the door (e.g., above the opening) to trigger powered operation (i.e., sliding) of the sliding panels responsive to detection of an individual or equipment approaching the door. In some cases, when the sliding panels are fully retracted, the fixed and sliding panels on each side may also hingedly open by swinging out of the common plane about hinges that operably couple the fixed panels to the left and right door jambs, respectively. This movement is typically manual, and is referred to as full breakout (and the preceding a fixed sidelite). Full breakout may enable the door to provide an egress or ingress space that extends fully between the left and right door jambs (instead of merely having a width defined by the opening between the fixed panels).

The doors described above are very popular, and have significant utility as a main entryway for a commercial or industrial business application, or for hospitals and other facilities. However, it may be desirable to modify this basic structure to adapt the door for other applications in other settings such as, for example, quick service window settings.

BRIEF SUMMARY OF SOME EXAMPLES

In an example embodiment, a door assembly may be provided. The door assembly may include a first sidelite configured to be operably coupled to a first doorjamb, a second sidelite configured to be operably coupled to a second doorjamb where the first and second sidelites are disposed in a common plane and defining a door opening between the first and second sidelites, a first sliding panel, a second sliding panel where the first and second sliding panels are movable from a closed position disposing the first and second sliding panels to block access through the door opening and an open position in which the first sliding panel is proximate the first sidelite and the second sliding panel is proximate the second sidelite, and are disposed in a second plane parallel to the common plane in both the open and closed position, a first partial door panel disposed in a third plane opposite the second plate relative to the common plane, and a second partial door panel disposed in the third plane, the first and second partial door panel being movable from being a closed state in which the first and second partial door panels at least partially block access through the door opening and an open state in which the first partial door panel is proximate the first sidelite and the second partial door panel is proximate the second sidelite. The first and second partial door panels are each operably coupled to a biasing assembly that biases the first and second partial door panels toward the open state, and the first and second partial door panels are configured to be transitioned to the closed state by manual operation against a force of the biasing assembly.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
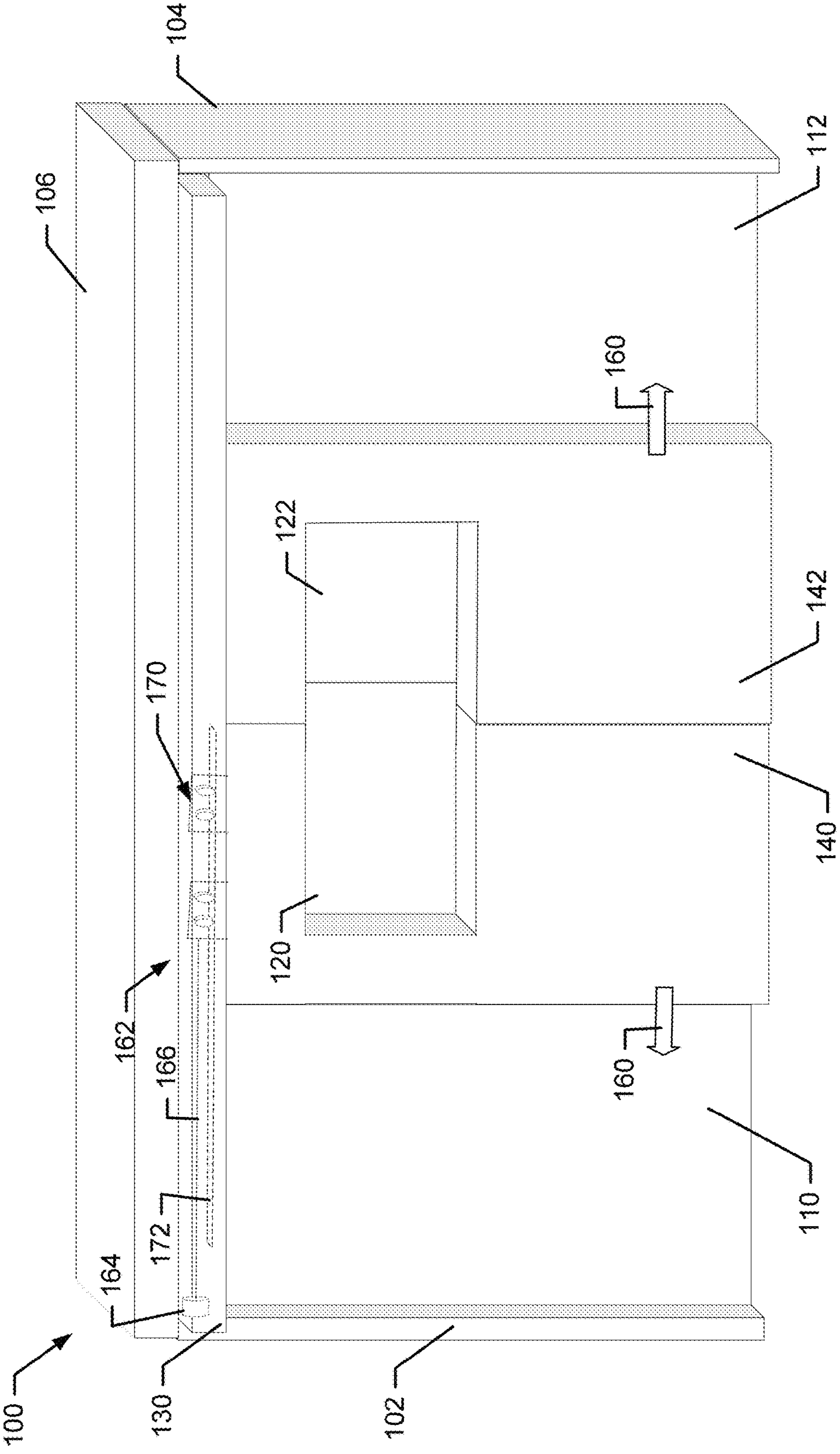
FIG. 1 illustrates an external perspective view of a door assembly with sliding panels in a closed position, and including a partial door assembly also in a closed state in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, it may be desirable to modify a typical automatic door that provides a main entryway to enable the door to be used for other purposes. One such modification may include the provision of a partial door assembly, which may be a half door assembly, a "C" style door assembly, or "G" style door assembly in some cases. For example, the partial door assembly could be provided to close off the bottom half of the common opening otherwise defined between the fixed panels. With the partial door assembly in the opened position, the fixed and sliding door panels may function as described above to permit automatic operation of the sliding door panels to provide ingress or egress via the full area of the common opening. However, with the partial door assembly in the closed position, at least the bottom half of the common opening may be blocked by the partial door assembly. In this configuration, the top portion of the common opening may, when closed, define a quick service window.

Although other uses may also be possible, one convenient usage for the arrangement described above may be in the restaurant industry, where the quick service window is a long used fixture. However, the most familiar quick service window structure is one of just a window formed in an otherwise solid wall, which does not permit the quick service window to be used as a door under any circumstances. By employing a set of interior automatic doors with a partial door assembly as a set of exterior doors, the quick service window structure that results may also be useful for other business enterprises where passage of goods from inside the business enterprise to customers outside may be accomplished. When the partial door assembly is closed, the automatically operable window function of the inner door may be employed to define the quick service window functionality that is so familiar and desirable in many contexts. However, if it is desirable to instead utilize the full opening, such as at busy times or when moving large quantities or sizes of goods when it may be preferable to walk out of the doors to deliver the goods, the partial door assembly may be opened thereby restoring normal automatic door operation to the inner automatic doors and providing an entirely new delivery paradigm.

As can be appreciated from the description above, implementation of the partial door assembly could likely be accomplished by a number of different methods. For example, the partial door assembly could be implemented via swinging doors. However, swinging the doors could be undesirable in some contexts. Alternatively, the partial door assembly could be implemented via sliding partial doors that lie in a third plane adjacent the plane of the fixed panels and opposite the plane of the sliding panels (relative to the fixed panels). However, even this arrangement has multiple possible ways of being implemented. One such way may be to slidably attach the sliding partial door assembly to the fixed panels. This may create the simplest construction, and may be the cheapest and easiest solution. However, when constructed in this way, the tracks for sliding will necessarily be exposed to the weather, and to fouling that may be common to the context in which the doors are used. For example, the tracks will need to be greased, and the grease will retain dirt and debris that rapidly leads to damage or reduced functionality. Thus, the tracks may need constant servicing in order to function properly. Also, since food products are often passed through the quick service window, if any fall, the food products may foul any rolling tracks or components at the bottom side of the partial door assembly panels. In short, this simple structure is fraught with design problems that will require significant and ongoing attention and maintenance.

To address this problem, and create a product that is both functionally and structurally superior, example embodiments provide a track system for the partial door assembly panels that avoids any external or exposed track components either at the side or bottom of the partial door by incorporating an inverted track at the bottom of the partial door assembly and an overhead wheel carrier track system at the top of the partial door assembly. The overhead wheel carrier track system, of course, means the partial door assembly will be embodied with a "C" or "G" type door panel instead of a half door. But there is otherwise no slidable connection (or any other physical connection that would create exposed tracks) between the partial door assembly and the fixed panels of the inner door assembly by this construction. Moreover, there is no track or flat surface below the partial door assembly that can become fouled either.

As will be discussed in greater detail below, example embodiments may also bias the partial door assembly toward the open position, which is a counterintuitive approach that actually provides a significant advantage for security purposes. In this regard, the typical approach would be to bias the partial door assembly closed so that while the automatic doors on the inside can open responsive to motion or action by employees inside, the outer partial door assembly automatically (e.g., due to the biasing) resumes the closed position to create the quick service window appearance. However, experience has shown that employees will often forget to lock these exterior doors if they are biased closed. This can lead to the doors being left unlocked and creating a security risk since and intruder need only manually open the doors against the relatively weak force of the biasing member. Moreover, when (as noted above) the tracks get fouled or something prevents the doors from being fully shut, a gap between the panels of the partial door assembly may start to form and grow over time, which may ultimately allow rodent or other pest intrusion.

By employing the counterintuitive approach of making the partial door assembly biased to the open position, the employees cannot fail to notice when the partial door assembly is in an unlocked state since locking the door will be required in order to sustain the quick service window arrangement. In this regard, the employees must manually close the partial door assembly and lock it in the closed position to retain the quick service window arrangement. This prevents the security issues noted above and, in combination with the inverted track and overhead wheel carrier track system, which themselves combine to minimize maintenance requirements and ensure full and easy functioning of the partial door assembly over time, also prevents the intrusion possibility from pests. Locking the door also prevents any movement of the door from occurring responsive to an employee leaning on the door or out the service window (e.g., to hand food or other items to a customer). In some embodiments, the locking function may be accomplished using a hook bolt style lock. However, some embodiments may further integrate a hardened steel lock pin that actuates downward into the subfloor or threshold to lend further support to the partial door assembly and to provide locking forces at multiple points instead of just at a single point. Finally, in addition to the functional superiority described above, example embodiments provide an appearance to external viewers that is generally aesthetically pleasing. Some other enhancements and improvements will also be discussed below.

Figure 2:
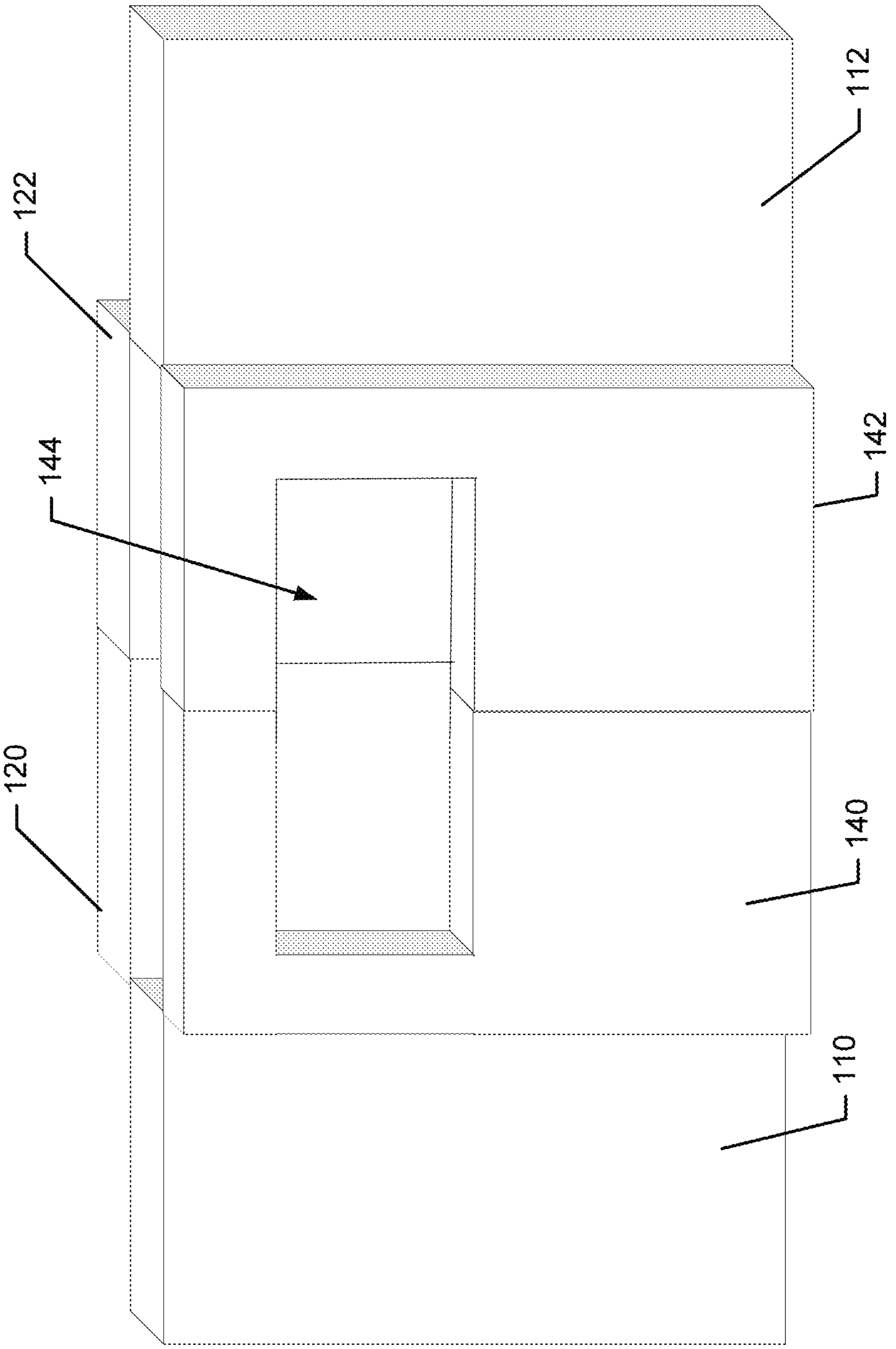
FIG. 2 shows a perspective view of the door assembly of FIG. 1 with framing removed in accordance with an example embodiment
Figure 3:
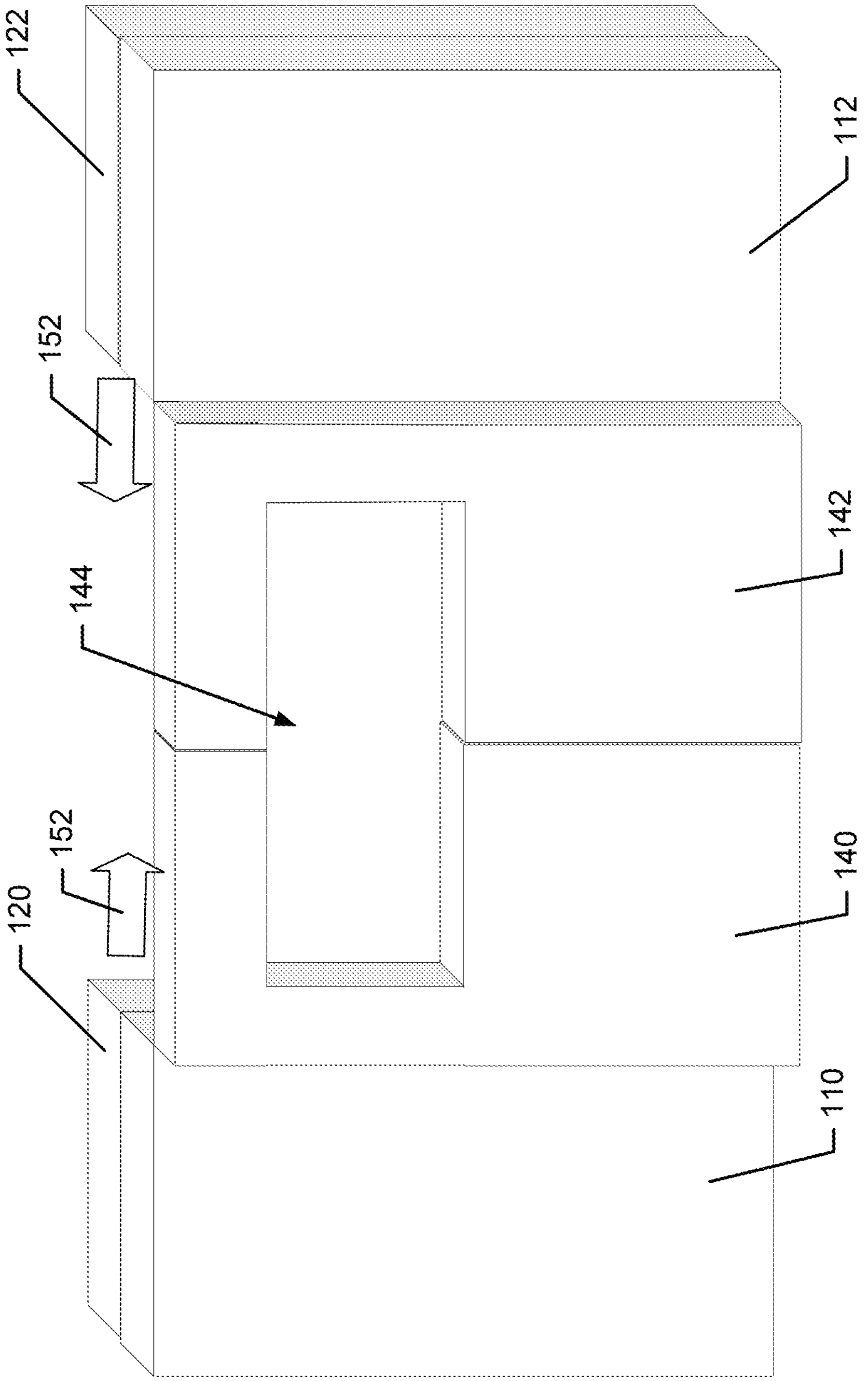
FIG. 3 illustrates a perspective view of the door assembly of FIG. 2, with sliding panels on the interior side having moved to the open position while the partial door assembly remains in the closed state according to an example embodiment.
Figure 4:
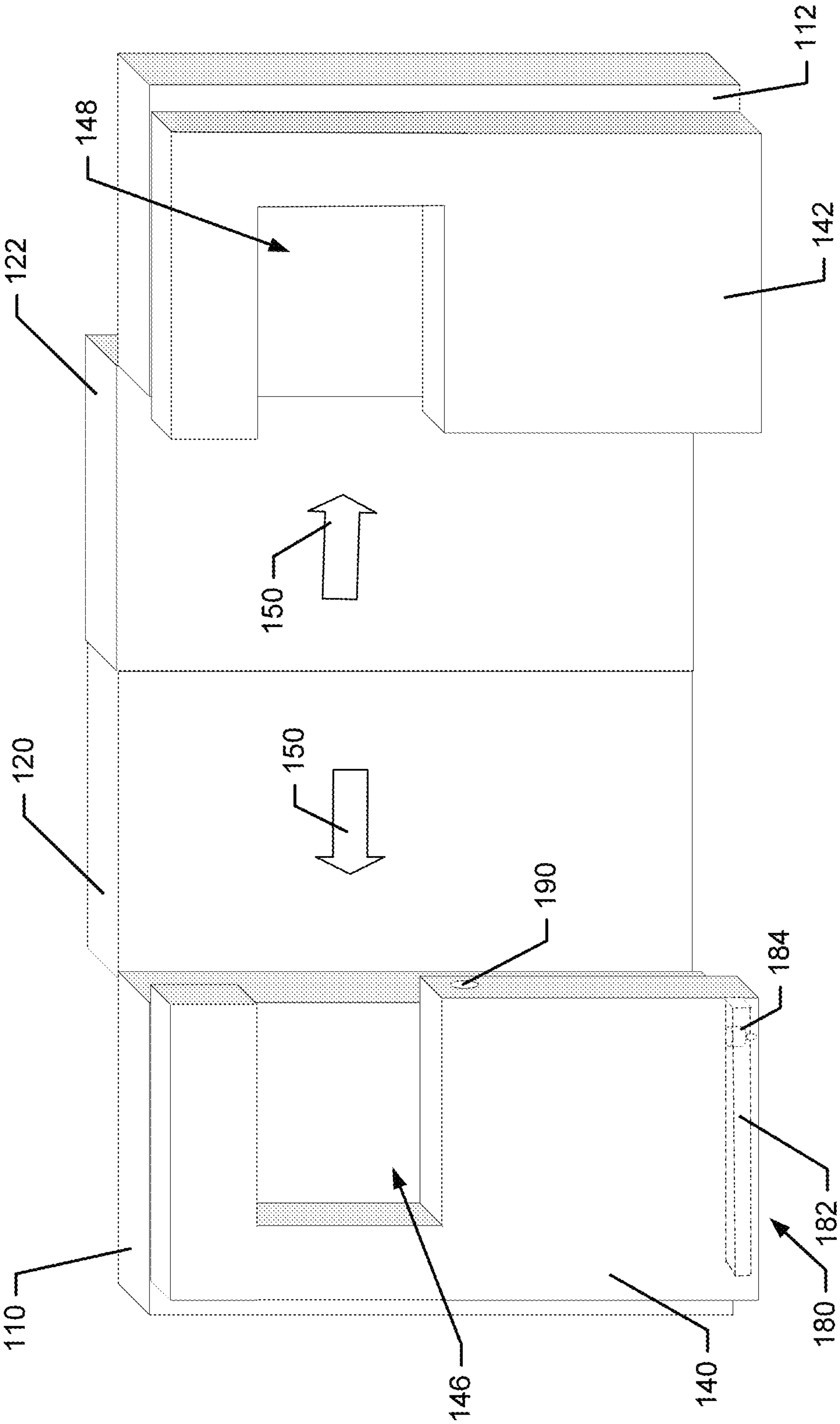
FIG. 4 shows a perspective view of the door assembly of FIG. 2 with sliding panels in the closed position while the partial door assembly is in an open state according to an example embodiment.
Figure 5:
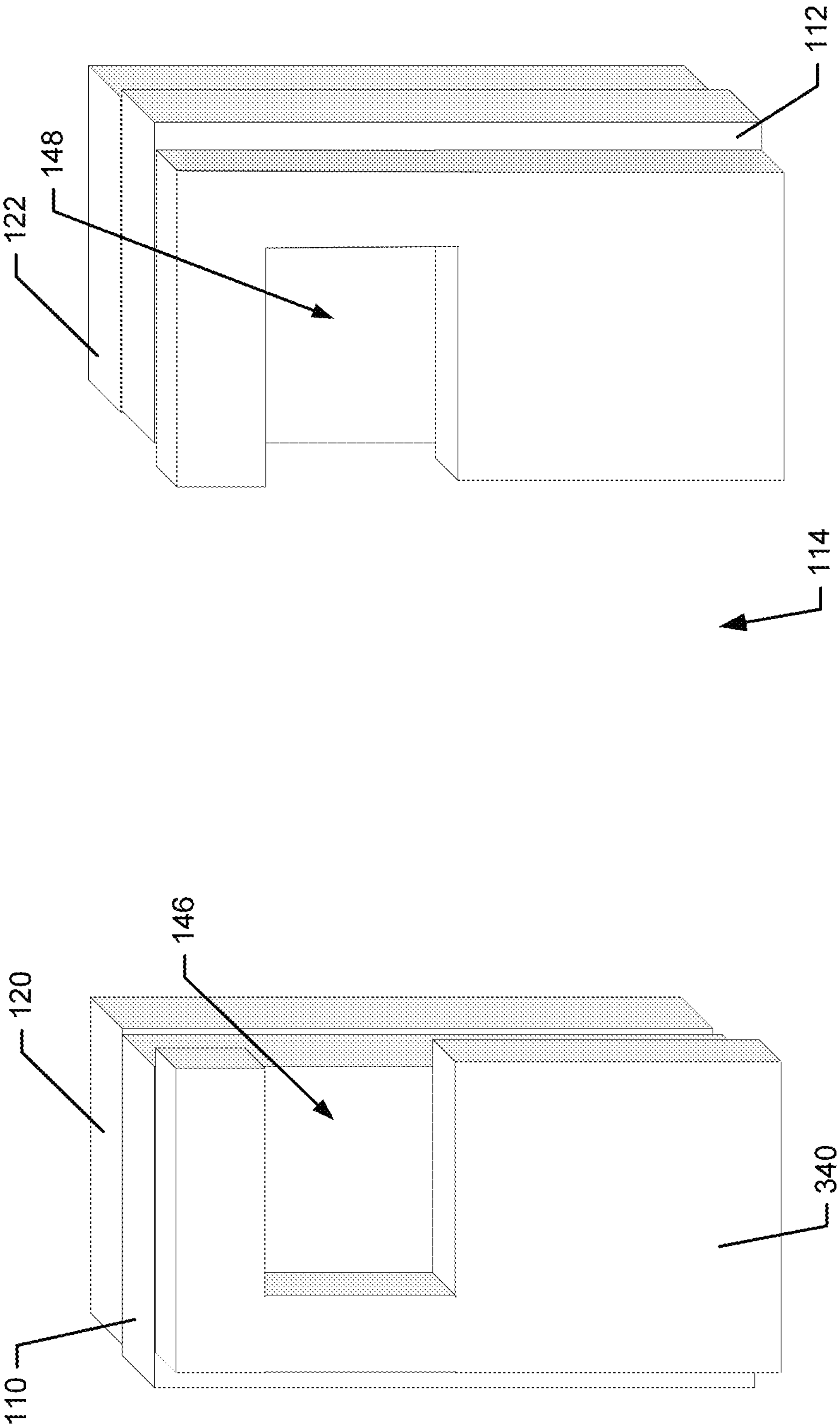
FIG. 5 shows a perspective view of the door assembly of FIG. 2 with sliding panels in the open position while the partial door assembly is also in the open state according to an example embodiment.

Accordingly, a design that is both aesthetically pleasing and also functionally and structurally superior will be described herein. FIGS. 1-5 illustrate a schematic representation of components associated with an example of such a door design in multiple configurations. In this regard, FIG. 1 illustrates an external perspective view of a door assembly 100 of an example embodiment disposed in a wall. FIG. 2 shows the door assembly 100 of FIG. 1 in isolation. In FIGS. 1 and 2, the door assembly 100 is fully closed. FIG. 3 shows the door assembly 100 with interior doors opened and outer doors closed. FIG. 4 shows the outer doors opened and the inner doors closed, and FIG. 5 shows the inner and outer doors opened.

Referring to FIGS. 1-5, the door assembly 100 fits into an opening in the wall, which is bounded by a first doorjamb 102, a second doorjamb 104, and an upper frame member 106 that combine to define a door frame for the door assembly 100. Although the door assembly 100 can be scaled to any desirable size, a common width and height for the door frame may be about 84 inches and 92 inches, respectively.

A first fixed pane or first sidelite 110 may be operably coupled to the first door jamb 102, and a second fixed pane or second sidelite 112 may be operably coupled to the second door jamb 104. As noted above, the size of the first and second sidelites 110 and 112 may vary. However, in an example embodiment, each of the first and second sidelites 110 and 112 may have a width of about 21 to 22 inches, and a height of about 84 inches. The first and second sidelites 110 and 112 may normally be latched or fixed in the position shown in FIG. 1. In such position, each of the first and second sidelites 110 and 112 may be in a common plane. A space provided between the first and second sidelites 110 and 112 may form a door opening 114 (see FIG. 5) having a width of about 40 to 42 inches. The door opening 114 also lies in the common plane.

The door assembly 100 may further include a first sliding panel 120 and a second sliding panel 122. The door assembly 100 also includes a partial door assembly that is supported, at least in part from above via an overhead support assembly 130, which may be attached to the upper frame member 106 and/or the first and second door jambs 102 and 104. The partial door assembly includes a first partial door panel 140 and a second partial door panel 142, which will be described in greater detail below. The first and second sliding panels 120 and 122 may be operably coupled to an electronically controllable motor assembly, or other motive assembly capable of providing power for movement of the first and second sliding panels 120 and 122. In an example embodiment, the motor assembly may be operably coupled to one or more sensors, which may detect motion and, responsive to detection of such motion, trigger the motor assembly to cause movement of the sliding panels from the closed position shown in FIGS. 1, 2 and 4 to an open position shown in FIGS. 3 and 5. Examples of the sensors will be described in greater detail below.

As noted above, FIGS. 3 and 5 each show a perspective view of the door assembly 100 of FIG. 1 with the first and second sliding panels 120 and 122 in the open position. In FIGS. 2-5, the first and second door jambs 102 and 104 and the upper frame member 106 have been removed to provide a better view of the relationship between the first and second sliding panels 120 and 122 and the first and second sidelites 110 and 112 in the opened and closed positions. In this regard, the first and second sliding panels 120 and 122 may be retained by a retention assembly such as, for example, a track, guide rail and/or other movement guidance features that define a predetermined path for travel of the first and second sliding panels 120 and 122 during movement thereof. In this regard, the retention assembly of the first and second sliding panels 120 and 122 may enable the first and second sliding panels 120 and 122 to be moved between the open position (of FIGS. 3 and 5) and the closed position (of FIGS. 1, 2 and 4) responsive to operation of the motor assembly along the predetermined path. Components of the retention assembly may be provided in the upper frame member 106 and/or at the floor disposed below the first and second sliding panels 120 and 122. However, these components are generally outside the scope of this disclosure, and therefore will not be described in detail.

As can be appreciated from FIGS. 1-5, the first and second sliding panels 120 and 122 may lie in a second plane that is adjacent to and parallel to the common plane in which the first and second sidelites 110 and 112 are normally retained. Moreover, while in the closed position of FIGS. 1, 2 and 4, the open position of FIGS. 3 and 5, and during movement between the open and closed positions, the retention assembly retains the first and second sliding panels 120 and 122 in the second plane.

The first and second sliding panels 120 and 122 may have similar dimensions to those of the first and second sidelites 110 and 112, such that when in the open position of FIG. 2, the first sliding panel 120 becomes substantially aligned with the first sidelite 110 and the second sliding panel 122 becomes substantially aligned with the second sidelite 112. In this regard, corresponding edges (e.g., inner and outer edges as determined relative to proximity to the door opening 114) of the first and second sliding panels 120 and 122 and the first and second sidelites 110 and 112, respectively, may be aligned with each other. Meanwhile, when in the closed position of FIG. 1, the outer edge of the first and second sliding panels 120 and 122 may be substantially aligned with the inner edges of the first and second sidelites 110 and 112, respectively. At the same time, the inner edges of the first and second sliding panels 120 and 122 may meet each other at a center of the door opening 114.

Thus, for example, the first and second sliding panels 120 and 122 may move the direction of arrows 150 in FIG. 4 away from each other to move the first and second sliding panels 120 and 122 to transition from the closed position of FIG. 4 to the open position shown in FIG. 5. The first and second sliding panels 120 and 122 may then move toward each other as shown by arrows 152 in FIG. 3 to return to the closed position shown in FIGS. 1 and 2. Movement of the first and second sliding panels 120 and 122 in either the direction of arrows 150 or 152 is powered by the motor assembly, and is limited by the retention assembly to retain the first and second sliding panels 120 and 122 in the second plane. Although outside the scope of the present disclosure, it should be appreciated that the first and second sliding panels 120 and 122 may be locked in the closed position by a lock assembly or various latching apparatuses. The lock assembly or latching apparatuses may affix the first and second sliding panels 120 and 122 to each other, to the upper frame member 106, to the floor, or to any other suitable structure of the door assembly 100 or the environment proximate thereto.

Figure 7:
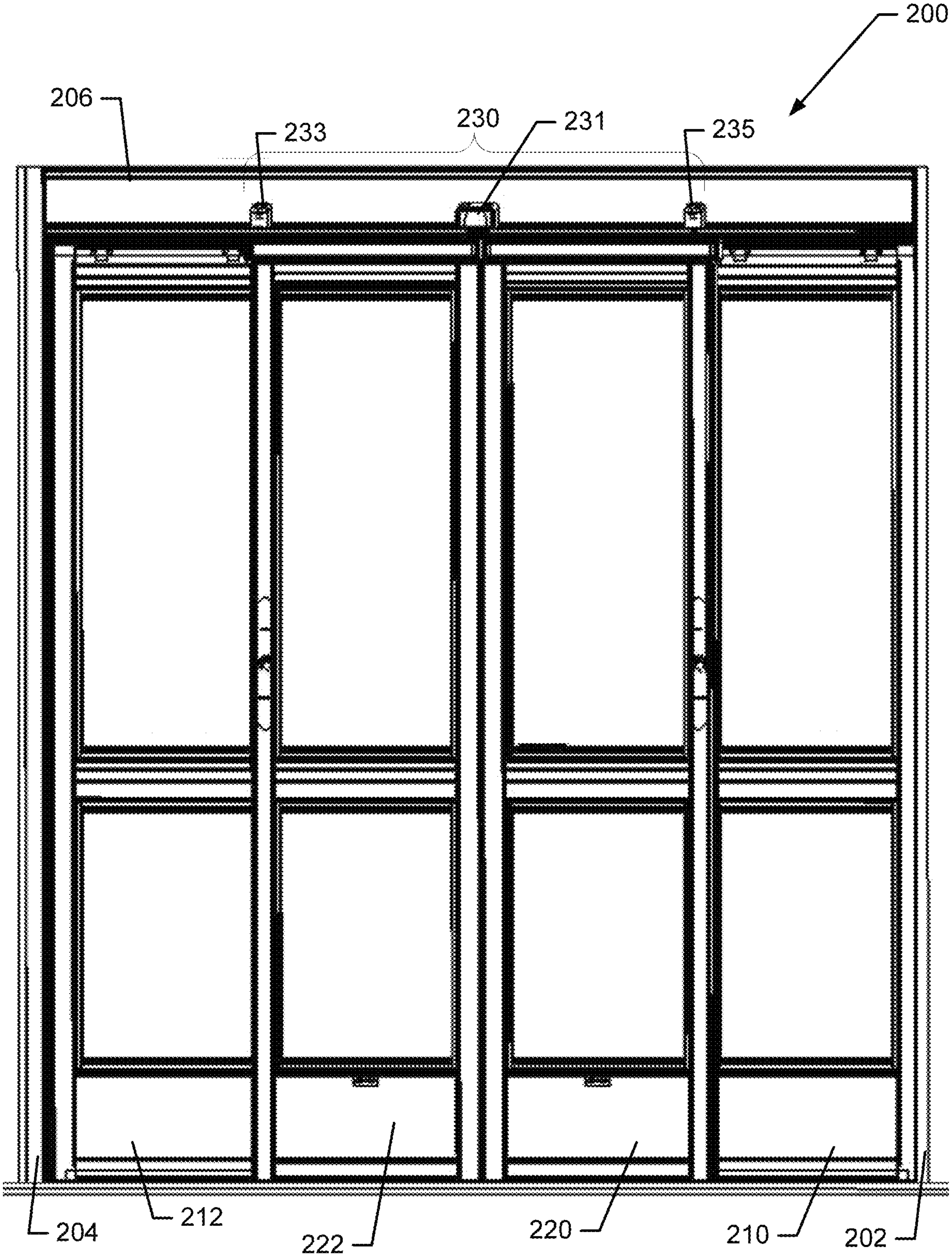
FIG. 7 illustrates an internal elevation view of the door assembly in accordance with an example embodiment.

The operation of the first and second sliding panels 120 and 122 is typically automated based on detection of motion (e.g., by a sensor) of an object or individual approaching the door assembly 100. Notably, although the sensor is not visible in FIGS. 1-5, such sensor is typically disposed on the upper frame member 106 on the internal side or inside of the door assembly 100. An example of some sensors that may be employed in some embodiments is shown and described below in reference to FIG. 7. Thus, objects or individuals approaching the door assembly 100 from either direction can be expected to trigger automatic (and simultaneous) operation of the first and second sliding panels 120 and 122 to transition the first and second sliding panels 120 and 122 to the open position. After a time delay, and assuming no further motion is detected, the first and second sliding panels 120 and 122 may return to the closed position. This automatic operation described above may provide a convenient and efficient way to manage ingress and egress from a building or business.

Although this paradigm for door operation at a building or business may be familiar for use as a primary mechanism by which customers enter and exit a business, modification of the door assembly 100 may upgrade the door assembly 100 to configure the door assembly 100 for still other uses or functions. For example, by providing the partial door assembly noted above, the door assembly 100 may be configured to resemble an automated drive up or quick service window. In this regard, the door assembly 100 may appear as shown in FIG. 1 when no vehicle or customer has approached the external side of the door assembly 100. However, when a vehicle or customer approaches the door assembly 100, a worker or employee may proceed toward the first and second sliding panels 120 and 122 and trigger the sensor. Responsive to triggering the sensor, the first and second sliding panels 120 and 122 may automatically open to the position of FIG. 3, and the customer may be provided with goods, items, or services through the portion of the door opening 114 that remains unobstructed by the first and second partial door panels 140 and 142 of the partial door assembly. This unobstructed portion of the door opening 114 may be referred to as a service window 144, which may only be formed when the first and second partial door panels 140 and 142 are in the closed position. In this regard, when the first and second partial door panels 140 and 142 are in the opened position of FIGS. 4 and 5, the service window 144 is not formed.

Instead, individual gap portions 146 and 148 are formed in each respective one of the first and second partial door panels 140 and 142. The individual gap portions 146 and 148 face or are opened toward each other, and form a gap in the first and second partial door panels 140 and 142 that give the first and second partial door panels 140 and 142 the characteristic shape of a G-shaped or C-shaped partial door panel type. The G or C-shaped partial door panels may be achieved by defining a frame member that extends along a full vertical length of the first and second partial door panels 140 and 142, respectively. Atop portion of the frame member may then have an extension portion that extends substantially perpendicularly away from the frame member at a top part of the first and second partial door panels 140 and 142, and a bottom portion of the frame member may then have an extension portion that extends substantially perpendicularly away from the frame member at a bottom part of the first and second partial door panels 140 and 142. The individual gap portions 146 and 148 may separate the extension portions at the top and bottom parts of the first and second partial door panels 140 and 142.

The movement of the first and second partial door panels 140 and 142 may be provided via sliding of the first and second partial door panels 140 and 142 between open and closed positions in a third plane that is parallel to the common plane and the second plane and opposite the second plane relative to the common plane. In an example embodiment, the first and second partial door panels 140 and 142 may be biased apart from each other to open (as shown by arrows 160 in FIG. 1. The biasing may be provided by a biasing assembly 162 that is disposed inside a portion of the overhead support assembly 130. The biasing assembly 162 is shown in dashed lines in FIG. 1 since it is inside the overhead support assembly 130 and otherwise not visible. The biasing assembly 162 (one instance of which may be provided for each respective one of the first and second partial door panels 140 and 142) may include one or more motors, springs, belts, pulleys or other biasing components that apply a biasing force to each respective one of the first and second partial door panels 140 and 142 toward an open state. In some embodiments, the biasing assembly 162 may include a spring motor 164 and a linking member 166 (e.g., belt, cable, chain, etc.) that is attached to a respective one of the first and second partial door panels 140 and 142 and to either or both of a fixed anchor point and the spring motor 164 of the other partial door panel to pull the respective one of the first and second partial door panels 140 and 142 in the direction of arrow 160 when either not overcome by manual force, or not otherwise restrained. In other words, the biasing assembly 162 biases each respective one of the first and second partial door panels to an open state.

In an example embodiment, the first and second partial door panels 140 and 142 may each be supported from above by a respective instance of an overhead wheel carrier assembly 170, which may be provided in the overhead support assembly 130. The overhead wheel carrier assembly 170 is also shown in dashed lines in FIG. 1 since it is not otherwise visible in this view. The overhead wheel carrier assembly 170 may include wheels that roll on a track or bar 172 that is disposed in the overhead support assembly 130. By providing a substantial amount of the support for, and the componentry for automated mobility of, the first and second partial door panels 140 and 142 in the overhead support assembly 130, the componentry may be substantially shielded from the elements. Maintenance may therefore be less frequent, and no fouling or debris may negatively impact the interface between the bar 172 and the wheels of the overhead wheel carrier assembly 170.

Meanwhile, the first and second partial door panels 140 and 142 may each be supported at a bottom portion thereof by a respective instance of an inverted slide assembly 180. FIG. 4 illustrates the inverted slide assembly 180 in dashed lines (since the components of the inverted slide assembly 180 are otherwise generally not visible due to being inside the respective bottom portions of the first and second partial door panels 140 and 142. The inverted slide assembly 180 may include an inverted U shaped track 182, and a track slider 184 that may extend upward from the floor to slidably engage the inverted U shaped track 182 (and slide therein) as the first and second partial door panels 140 and 142 slide between open and closed positions.

Like the overhead wheel carrier assembly 170, components of the inverted slide assembly 180 are generally not exposed, and therefore less susceptible to fouling. The inverted slide assembly 180 also omits any wheels that need lubrication, and avoids presenting a flat surface on which the wheels would roll, but on or in which food, dirt, debris, etc. may otherwise also accumulate to inhibit sliding of the first and second partial door panels 140 and 142. The provision of the overhead wheel carrier assembly 170 and the inverted slide assembly 180 therefore combine to provide a way for the first and second partial door panels 140 and 142 to remain mobile and slide within the third plane with minimal maintenance by virtue of not having exposed components. However, another advantage of this support structure is that the first and second partial door panels 140 and 142 are independent of, and not slidably engaged with the first and second sidelites 110 and 112, respectively. This enables the spacing between the first and second partial door panels 140 and 142 and the first and second sidelites 110 and 112, respectively, to be minimized to prevent debris from accumulating therein, and also prevent access to pests.

As noted above, the first and second partial door panels 140 and 142 may be biased open (e.g., by the biasing assembly 162). Biasing the first and second partial door panels 140 and 142 is entirely counterintuitive, since the normal position of the first and second partial door panels 140 and 142 to achieve the formation of the service window 144 is closed. However, this biasing counter to intuition provides significant practical advantage for this context based on the experience of real world operation. In this regard, the biasing toward the open position ensures that manual effort must be used to close the first and second partial door panels 140 and 142 (i.e., move them in the direction opposite arrows 160). Moreover, to maintain the service window 144 formation, the first and second partial door panels 140 and 142 must be physically restrained proximate to each other (e.g., by lock assembly 190 shown in FIG. 4).

These operational considerations stand contrary to the intuitive approach of biasing the first and second partial door panels 140 and 142 to the closed position to ensure continued formation of the service window 144 with only manual effort used to separate and open the first and second partial door panels 140 and 142. However, experience shows that when the first and second partial door panels 140 and 142 are biased closed, employees often forget to lock them closed at the end of the work day. This leaves the first and second partial door panels 140 and 142 exposed to the possibility of being forced open by an intruder. Moreover, to the extent the biasing componentry wears over time, the first and second partial door panels 140 and 142 may otherwise, if biased closed, reach a point at which they do not fully meet each other in the closed position. This may let dirt, debris or pests enter as noted above. However, manual closure that is necessarily followed by a locking operation fully ensure security and continuity of the barrier provided by the first and second partial door panels 140 and 142 when closed. Thus, the combination of effects of requiring manual closure and locking is what gives the counterintuitive approach taken by some example embodiments added value.

The lock assembly 190 may be embodied as a flush mounted cylinder lock (which may operate a flush mounted bolt). The lock assembly 190 may therefore be mounted on an internal side of the first and second partial door panels 140 and 142 so as to not be visible (or operable) externally when the partial door assembly is in the closed position. The fact that the cylinder lock is flush mounted may not only present an aesthetically pleasing appearance from the internal side of the door assembly 100, but may also permit the space between the first and second partial door panels 140 and 142 and the first and second sliding panels 120 and 122 to be relatively small, thereby further supporting the advantages noted above with respect to minimization of the gap therebetween.

The fact that the first and second partial door panels 140 and 142 are in a third plane, which is parallel to the common plane, in the open position may also be helpful. In this regard, for example, the first and second partial door panels 140 and 142 and all mounting componentry associated therewith can be disposed to intersect with the third plane or in the third plane to ensure mounting that does not expose components to the elements since all mounting componentry is either directly above the first and second partial door panels 140 and 142 or directly below the first and second partial door panels 140 and 142. No componentry that supports the first and second partial door panels 140 and 142 is therefore disposed between the first and second sidelites 110 and 112 and the first and second partial door panels 140 and 142.

The transition from the configuration of FIGS. 1 and 2 to that of FIG. 3 should then be appreciated to be an automated transition that occurs responsive to motion at the sensor on the inside of the first and second sliding panels 120 and 122 (or at a similar sensor located on the internal side of the door assembly 100). Meanwhile, the transition from the configuration of the first and second partial door panels 140 and 142 in FIGS. 1-3 to that of FIGS. 4 and 5 (i.e., from closed to opened) is accomplished automatically, whereas movement in the reverse direction (i.e., from opened to closed) is manually accomplished with the lock assembly 190 thereafter being operated to retain the first and second partial door panels 140 and 142 in the closed position.

Figure 6:
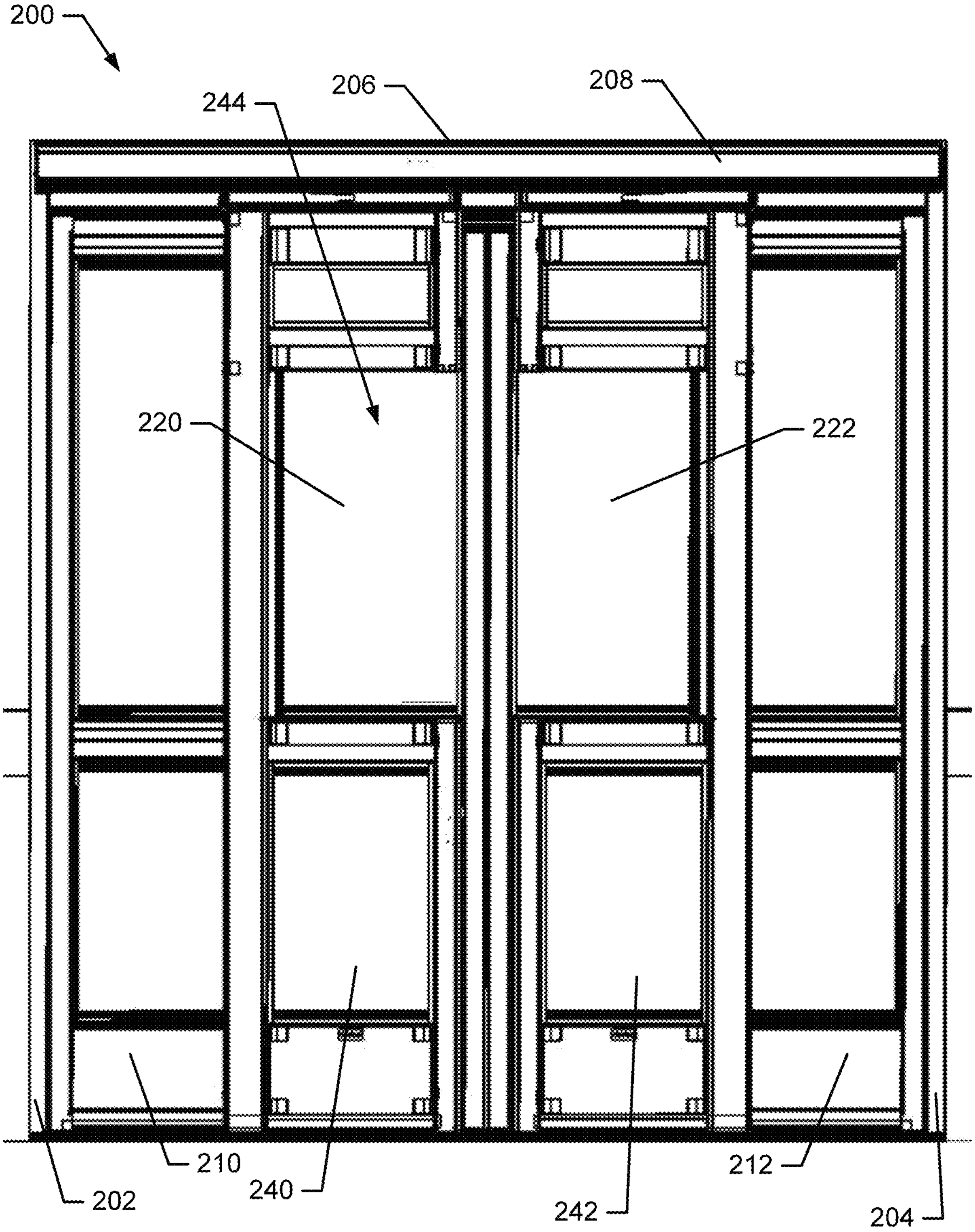
FIG. 6 illustrates an external elevation view of a door assembly of an example embodiment.

As noted above, the examples of FIGS. 1-5 are schematic in nature, and thus are neither to scale, nor necessarily representative of shapes and sizes of components represented. FIGS. 6-12 illustrate another example embodiment in which style elements and other aesthetic features that may be employed are demonstrated by way of example and not of limitation. In this regard, FIG. 5 illustrates an external elevation view of a door assembly 200 of an example embodiment. FIG. 6 illustrates an internal elevation view of the door assembly 200. The components of FIGS. 6-12 are examples of specific structures that may be used to embody the door assembly 100 described above in reference to FIGS. 1-5.

Referring now to FIGS. 6-12, the door assembly 200 includes a first doorjamb 202, a second door jamb 204, and an upper frame member 206 that combine to define a door frame for the door assembly 200. An overhead support assembly 208 may be attached to an exterior side of the upper frame member 206 and/or the first and second door jambs 202 and 204, and may house components for supporting components of the door assembly described in greater detail below. The door assembly 200 further includes a first sidelite 210 that may be operably coupled to the first doorjamb 202, and a second sidelite 212 that may be operably coupled to the second doorjamb 204. The first and second sidelites 210 and 212 may normally be latched or fixed in the position shown in FIGS. 6 and 7, and may each lie in a common plane. The space provided between the first and second sidelites 210 and 212 may form a door opening that also lies in the common plane.

Although the first and second sidelites 210 and 212 are normally fixed in the common plane, they may be capable of being swung open out of the common plane in some cases. In this regard, for example, the operable coupling between the sidelites and doorjambs may be provided via a respective hinge assembly on each side to enable either or both of the first and second sidelites 210 and 212 to be opened. In such examples, the hinge assembly may enable either or both of the first and second sidelites 210 and 212 to be swung from the closed (normal) position shown in FIGS. 6 and 7 to an opened position (not shown) in which condition very large equipment, or larger groups of people, may be moved in or out through the door assembly 200.

The door assembly 200 may further include a first sliding panel 220, a second sliding panel 222, and a partial door assembly including a first partial door panel 240 and a second partial door panel 242. The first and second sliding panels 220 and 222 and the first and second sidelites 210 and 212 may each have one or more transparent sub-panels and/or one or more opaque sub-panels disposed therein in any desirable combination.

The first and second sliding panels 220 and 222 may be operably coupled to an electronically controllable motor assembly, or other motive assembly capable of providing power for movement of the first and second sliding panels 220 and 222. In an example embodiment, the motor assembly may be operably coupled to a sensor assembly 230, which may include a first sensor 231, which may be disposed on the internal side of the upper frame member 206. The sensor assembly 230 may, in some cases, further include a second sensor 233 and/or a third sensor 235, each of which may be disposed on opposite sides of the first sensor 231 on the upper frame member 206. In an example embodiment, the first sensor 231 may be disposed on the upper frame member 206 midway between the inner edges of the first and second sidelites 210 and 212 (and where the first and second sliding panels 220 and 222 meet when closed). The second and third sensors 233 and 235 may be disposed above (or near) the inner edges of the first and second sidelites 210 and 212. In an example embodiment, the first sensor 231 may generate a light curtain that extends into the door opening to detect when someone is in the door opening or moving into/toward the door opening and, responsive to detection of such motion or presence, trigger the motor assembly to cause movement of the first and second sliding panels 220 and 222 from the closed position to the open position. In some embodiments, the second and third sensors 233 and 235 may each generate a vertical light beam directed downward toward the floor. Any interruption of the light beam may generate the trigger to operate the motor assembly. Thus, for example, a worker or employee may simply wave a hand while proximate to (and otherwise not moving) the door assembly 200 to interrupt the beam of one of the second or third sensor 233/235 in order to open the first and second sliding panels 220 and 222 to access the service window 244 and serve a customer.

Figure 8:
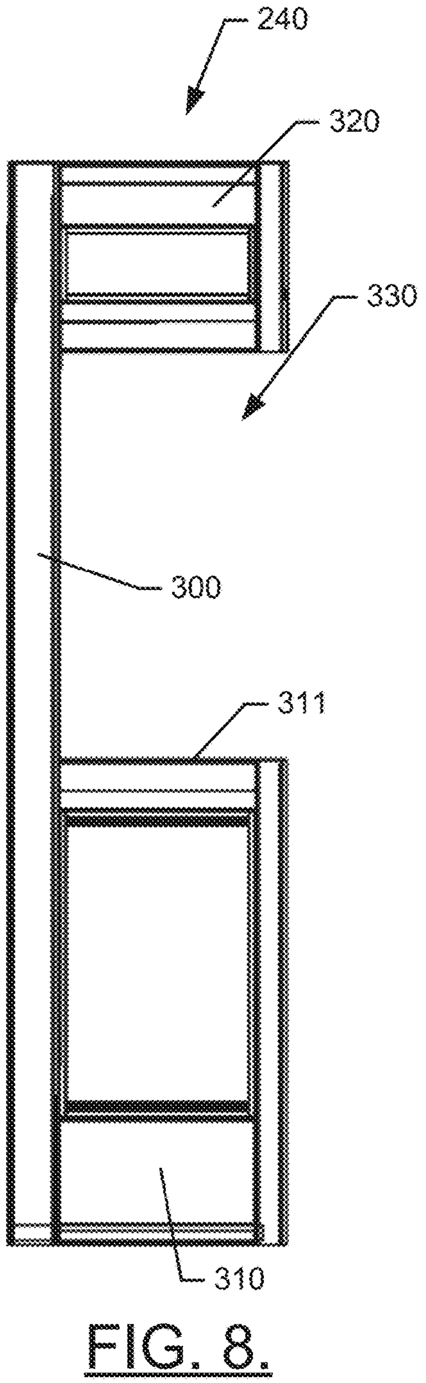
FIG. 8 illustrates an isolated front view of a partial door panel in accordance with an example embodiment.
Figure 9:
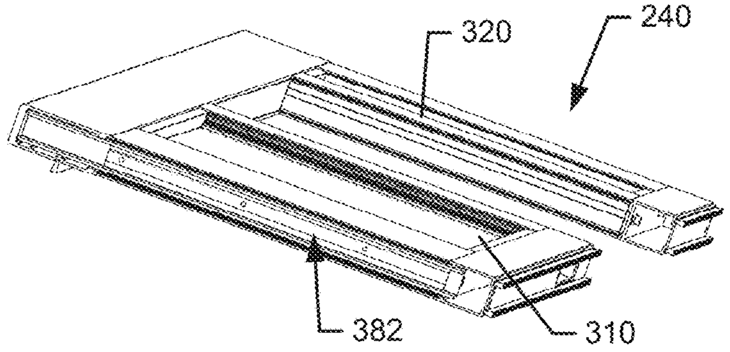
FIG. 9 illustrates a perspective view of the partial door panel of FIG. 9 showing an inverted U track therein in accordance with an example embodiment.

Referring now specifically to FIGS. 8 and 9, a structure of the first partial door panel 240 (which is identically mirrored by the second partial door panel 242) of an example embodiment will be described. The first partial door panel 240 includes a frame member 300 at one lateral edge thereof. The frame member 300 may extend along a full vertical length of the first partial door panel 240 from top to bottom thereof. The first partial door panel 240 also includes a lower extension portion 310 that extends away from the frame member 300 substantially perpendicularly to the frame member 300 at a lower portion of the first partial door panel 240, and an upper extension portion 320 that similarly extends away from the frame member 300 substantially perpendicularly to the frame member 300 at an upper portion of the first partial door panel 240. The lower and upper extension portions 310 and 320 may be spaced apart from each other by being disposed opposite a gap portion 330. The gap portion 330 may combine with a corresponding gap portion of the second partial door panel 242 when both are in the closed state to form the service window 244 (see FIG. 6). The lower and upper extension portions 310 and 320 may combine with the gap portion 330 to create the so called C-shape (or G-shape) of the first partial door panel 240.

Figure 10:
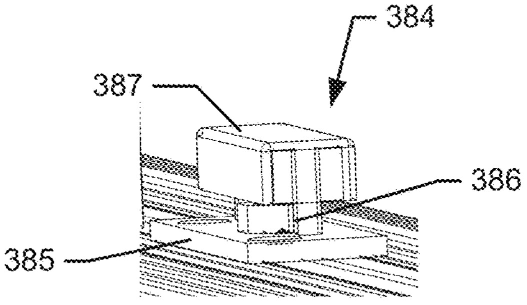
FIG. 10 illustrates a perspective view of a track slider that slides in the inverted U track in accordance with an example embodiment.

FIGS. 9 and 10 show portions of an inverted slide assembly, which forms a lower guide for sliding movement of the first partial door panel 240 in greater detail. In this regard, FIG. 9 shows an inverted U shaped track 382 disposed in a face of the lower extension portion 310 that is proximate to (and faces) the floor, or other surface above which the door assembly 200 is mounted. The inverted U shaped track 382 is closed at each opposing end thereof, and is therefore not normally visible. Given that the inverted U shaped track 382 is also facing downward, it generally also does not collect dust, debris, food, or other potentially obstructive objects.

Meanwhile, the inverted slide assembly also includes a bottom a track slider 384 that may extend upward from the floor to slidably engage the inverted U shaped track 382 (and slide therein). The track slider 384 of this embodiment includes a mounting plate 385 that is screwed or otherwise fixed to the floor or door threshold, a mounting post 386 that extends upward from the mounting plate 385, and a ball or block portion 387 that physically has dimensions and shape that are designed to slide smoothly but snuggly in the inverted U shaped track 382 as the first partial door panel 240 slides between open and closed states.

Figure 11:
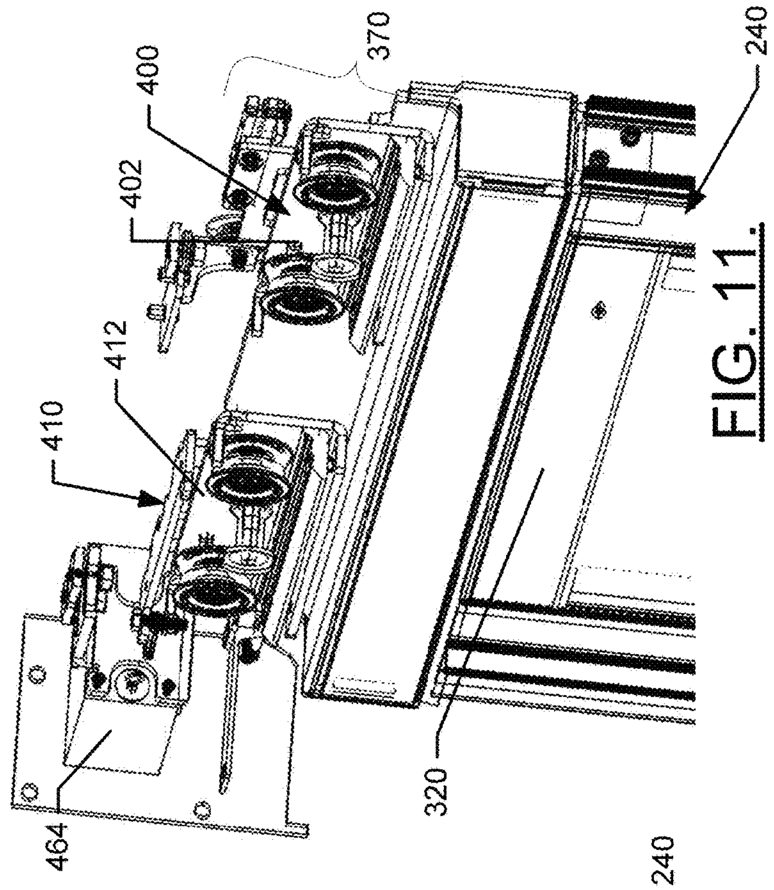
FIG. 11 illustrates componentry that is used to support sliding movement of the partial door panel from above in accordance with an example embodiment.

Turning to the componentry that is used to support sliding movement of the first partial door panel 240 from above, reference is now made to FIG. 11. Such componentry may be located within the overhead support assembly 208, which may be mounted or attached to the exterior side of the upper frame member 206. The overhead support assembly 208 may include framing and/or an exterior guard or shield member that provides a continuous metallic face plate to improve the aesthetic appearance of the door assembly 200. An overhead wheel carrier assembly 370 may be associated with each respective one of the first and second partial door panels 240 and 242 and may provide for general mobility of the first and second partial door panels 240 and 242, biasing of the first and second partial door panels 240 and 242 to the open state, and synchronized movement of the first and second partial door panels 240 and 242 toward the closed state.

In this regard, the overhead wheel carrier assembly 370 of FIG. 11, corresponds to the first partial door panel 240, and is mirrored by a similar structure that supports the second partial door panel 242. The overhead wheel carrier assembly 370 of FIG. 11 may include a first wheeled carrier 400 and a second wheeled carrier 410, which may be spaced apart from each other and support opposing lateral sides of the first partial door panel 240 from above (and hidden inside the overhead support assembly 208. Each of the first and second wheel carriers 400 and 410 may include a bracket assembly (402 and 412, respectively) that is operably coupled to the upper extension portion 320 of the first partial door panel 240, and one or more corresponding wheels or linear bearings to support sliding or rolling motion (e.g., over the track or bar 172 of FIG. 1). The first and second wheel carriers 400 and 410 therefore provide relatively smooth sliding motion of the first partial door panel 240 in combination with the inverted slide assembly of FIGS. 9 and 10.

However, as noted above, the sliding motion of the first partial door panel 240 (and the second partial door panel 242) is both biased and synchronized. In an example embodiment, biasing and/or synchronization may be accomplished using a spring motor 464. The spring motor 464 of FIG. 11 is shown to be operably coupled to the bracket assembly 402 of the second wheel carrier 410. However, the spring motor 464 could potentially alternatively be operably coupled to the first wheel carrier 400 (or its bracket assembly 410). In this architecture, the spring motor 464 may have a rest position at which the first partial door panel 240 is in the open state. Whenever the first partial door panel 240 is displaced from the open state (i.e., toward the closed state) by virtue of a person applying a closing force that overcomes the force of the spring or coil of the spring motor 464, the spring or coil of the spring motor 464 may build a return force to bring the first partial door panel 240 back to the open state when the closing force is released (or becomes less than the return force). A series of pulleys and/or cables may operably couple the spring motor 464 to an anchor point in the overhead support assembly 208. In this example embodiment, the spring motor 464 is affixed to a sidewall of the overhead support assembly 208, and is linked to the second wheel carrier 410 by a looped cable and clip. In some cases, the overhead support assembly 208 may also house a rotary damper to minimize impact between components to dampen sounds of components reaching movement end stops and extent the life of components.

To accomplish synchronicity with the second partial door panel 242, the spring motor 464 of the first partial door panel 240 and a corresponding mirrored spring motor of the second partial door panel 242 may be operably coupled to each other, or the first and second partial door panels 240 and 242 may be operably coupled to each other via a synchronization link (e.g., via pulleys, cables or other linkages) to provide such synchronicity such that when the first partial door panel 240 is pulled with a closing force toward the closed state, the second partial door panel 242 is also pulled simultaneously toward the closed state. In either case, a force exerted on the first partial door panel 240 may be transmitted through the synchronization link to the second partial door panel.

Figure 12:
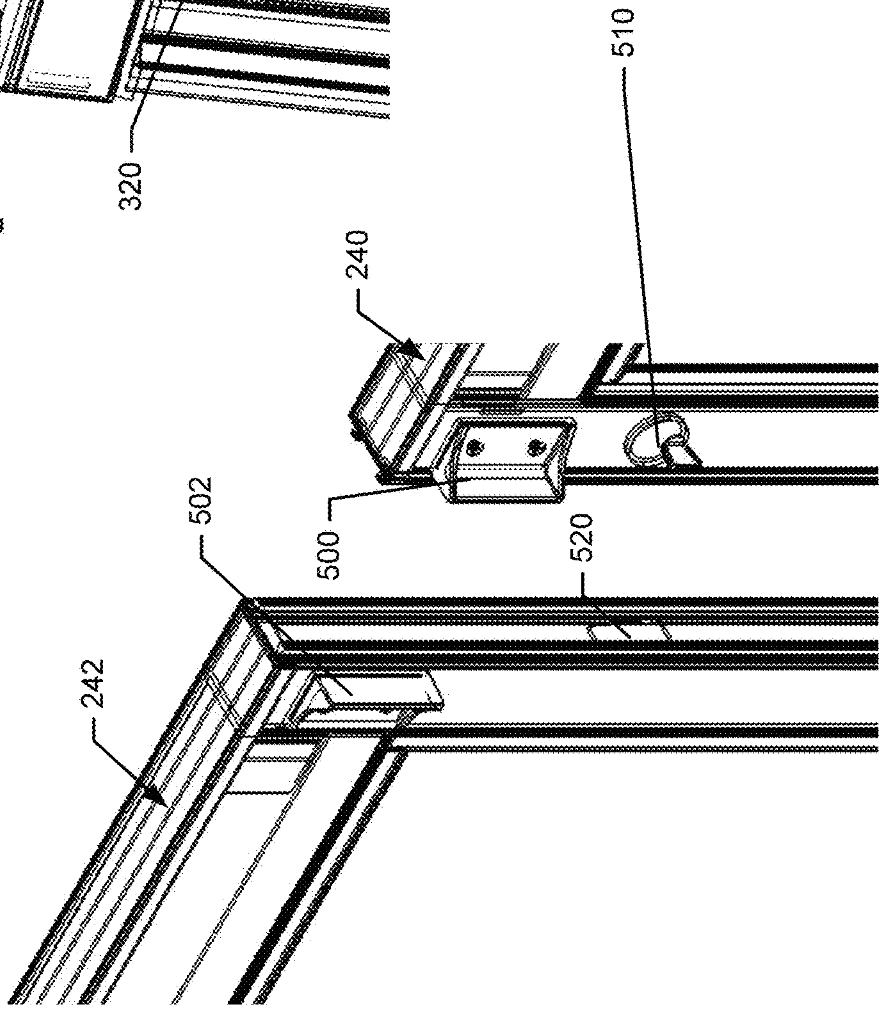
FIG. 12 illustrates a perspective view of a handle assembly for the partial door assembly in accordance with an example embodiment.

FIG. 12 illustrates a perspective view of a handle assembly for the partial door assembly in accordance with an example embodiment. The handle assembly may include a first handle 500 disposed at a top portion of the lower extension portion 310 of the first partial door panel 240, and a second handle 502 disposed at a top portion of the lower extension portion of the second partial door panel 240. In the example of FIG. 12, the handle assembly is also disposed at edges of the first and second partial door panels 240 and 242 that are proximate to each other when in the closed state. Thus, for example, the first and second handles 500 and 502 may be drawn close to each other (or even adjacent) when the first and second partial door panels 240 and 242 are drawn to the closed state.

The first and second handles 500 and 502 may be placed on an interior side of the first and second partial door panels 240 and 242, respectively. In this regard, in some cases, a gap may be formed between the first and second sidelites 210 and 212 and the first and second partial door panels 240 and 242, and the first and second handles 500 and 502 may extend into the gap. It may be desirable to keep the gap relatively small to provide less space for objects, debris or pests to enter. Thus, the first and second handles 500 and 502 may have a relatively short length of extension into the gap to enable the gap to be maintained as small as possible. Moreover, the first and second handles 500 and 502 are disposed at portions of the first and second partial door panels 240 and 242 that draw them close to each other when closed. Thus, for example, the employee or worker can "pinch" the first and second partial door panels 240 and 242 together with one hand so that the other hand is free to actuate the lock assembly.

The provision of the gap may also facilitate space for actuation of a lock assembly, which may be embodied as a flush mounted cylinder lock 510 on one of the partial door panels (e.g., on the first partial door panel 240 in FIG. 12). The cylinder lock 510 may operate a hook that rotates with the turning of a key or other actuator to extend out of the side of the first partial door panel 240 that faces the second partial door panel 242 to engage a latch receiver 520 disposed on the side of the second partial door panel 242 that faces the first partial door panel 240. However, as noted above, in some cases the operation of the cylinder lock 510 may also extend a locking pin into the threshold or subfloor to create two locking points instead of just one locking point. The lock assembly may therefore be mounted on an internal side of the first and second partial door panels 240 and 242 so as to not be visible (or operable) externally when the partial door assembly is in the closed position. The fact that the cylinder lock 510 is flush mounted may not only present an aesthetically pleasing appearance from the internal side of the door assembly 200, but may also permit the space or gap between the first and second partial door panels 240 and 242 and the first and second sidelites 210 and 212 to be relatively small, thereby further supporting the advantages noted above with respect to minimization of the gap therebetween.

In some cases a top edge of the lower extension portion 310 of the first partial door panel 240 (and also that of the second partial door panel 240) may be covered in a cap 311 such as, for example, a kitchen grade, stainless steel top cover. Provision of such a top cover may improve aesthetic appearance, ease of cleaning, and resistance to exposure to the elements. Additionally, the durability of the cap 311 may be superior as a result of this construction.

Accordingly, some example embodiments may provide a door assembly for use in a quick service, drive through, or other environment. The door assembly may include a first sidelite configured to be operably coupled to a first doorjamb, a second sidelite configured to be operably coupled to a second doorjamb where the first and second sidelites are disposed in a common plane and defining a door opening between the first and second sidelites, a first sliding panel, a second sliding panel where the first and second sliding panels are movable from a closed position disposing the first and second sliding panels to block access through the door opening and an open position in which the first sliding panel is proximate the first sidelite and the second sliding panel is proximate the second sidelite, and are disposed in a second plane parallel to the common plane in both the open and closed position, a first partial door panel disposed in a third plane opposite the second plate relative to the common plane, and a second partial door panel disposed in the third plane, the first and second partial door panel being movable from being a closed state in which the first and second partial door panels at least partially block access through the door opening and an open state in which the first partial door panel is proximate the first sidelite and the second partial door panel is proximate the second sidelite. The first and second partial door panels are each operably coupled to a biasing assembly that biases the first and second partial door panels toward the open state, and the first and second partial door panels are configured to be transitioned to the closed state by manual operation against a force of the biasing assembly.

The door assembly and/or components thereof described above may be augmented or modified by altering individual features mentioned above or adding optional features. The augmentations or modifications may be performed in any combination and in any order. For example, in some cases, the first and second partial door panels may each be supported from above by an overhead wheel carrier assembly and below by an inverted slide assembly. In an example embodiment, the inverted slide assembly may include an inverted U shaped channel disposed at a bottom portion of a respective one of the first and second partial door panels, and a track slider disposed below the door assembly to extend upward to slidably engage the inverted U shaped track as the respective one of the first and second partial door panels slides between the open state and the closed state. In some cases, the overhead wheel carrier assembly may include the biasing assembly and one or more wheels operably coupled to a track or bar to enable the overhead wheel carrier assembly to carry the respective one of the first and second partial door panels between the open and closed state. In an example embodiment, the overhead wheel carrier assembly may be disposed in an overhead support assembly disposed proximate an upper frame member of the door assembly. In some cases, the biasing assembly may include a spring motor and a linking member operably coupling the spring motor to the one or more wheels to pull the one or more wheels toward the open state. In an example embodiment, a lock assembly may retain the first and second partial door panels proximate to each other against a biasing force of the biasing assembly in the closed state. In some cases, the first and second partial door panels, respectively, may be spaced apart from, and not connected to, the first and second sidelites such that support of the first and second partial door panels is independent of the first and second sidelites. In an example embodiment, the first and second partial door panels may be supported for sliding in the third plane only by support components that are also disposed in the third plane. In some cases, the first and second partial door panels may each be substantially C-shaped. In an example embodiment, the first and second partial door panels may each include a lower extension portion and an upper extension portion disposed opposite a gap portion that forms a service window when the first and second partial door panels are in the closed state. In some cases, a lock assembly may retain the first and second partial door panels proximate to each other against a biasing force of the biasing assembly in the closed state, and the lock assembly may be disposed at a portion of the first partial door panel that faces a corresponding portion of the second partial door panel to engage the first and second partial door panels to each other. In an example embodiment, a stainless steel cap may be disposed at a top portion of the lower extension portion of each of the first and second partial door panels. In some cases, a handle may be disposed at an interior side of each of the first and second partial door panels, and the handle may extend into a space formed between the first and second partial door panels and the first and second sidelites, respectively. In an example embodiment, the first and second sliding panels may be automatically operable to transition from the closed position to the open position responsive to a trigger signal from a sensor assembly. In some cases, the sensor assembly may include a light curtain sensor disposed above the door opening to provide the trigger signal responsive to detecting an object approaching or in the door opening. In an example embodiment, the sensor assembly may include a set of vertical light sensors proximate to opposite lateral sides of a top portion of the door opening, the vertical light sensors providing a beam directed downward, where the vertical light sensors generate the trigger signal responsive to interruption of the beam at any height between the vertical light sensors and a base upon which the door assembly is disposed. In some cases, each of the first and second partial door panels may be simultaneously automatically transition to the open state when not restrained, and each of the first and second partial door panels may also be simultaneously moved toward the closed state manually. In an example embodiment, the first and second partial door panels may be simultaneously transitioned to the open state via a first spring motor and a second spring motor, respectively, and the first and second spring motors may be operably coupled to each other to synchronize movement toward the closed state when manually moved to the closed state. In some cases, a width of the first and second sidelites may be approximately equal to a width of each of the first and second sliding panels and the first and second partial door panels.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A door assembly comprising:

a first sidelite configured to be operably coupled to a first doorjamb;

a second sidelite configured to be operably coupled to a second doorjamb, the first and second sidelites disposed in a common plane and defining a door opening between the first and second sidelites;

a first sliding panel;

a second sliding panel, the first and second sliding panels movable from a closed position disposing the first and second sliding panels to block access through the door opening and an open position in which the first sliding panel is proximate the first sidelite and the second sliding panel is proximate the second sidelite, the first and second sliding panels disposed in a second plane parallel to the common plane in both the open and closed position;

a first partial door panel disposed in a third plane opposite the second plane relative to the common plane; and a second partial door panel disposed in the third plane, the first and second partial door panels movable from being a closed state in which the first and second partial door panels at least partially block access through the door opening and an open state in which the first partial door panel is proximate the first sidelite and the second partial door panel is proximate the second sidelite, wherein the first and second partial door panels are each operably coupled to a biasing assembly that biases the first and second partial door panels toward the open state, wherein the first and second partial door panels are configured to be transitioned to the closed state by manual operation against a force of the biasing assembly, wherein each of the first and second partial door panels is simultaneously automatically transitioned to the open state when not restrained, wherein each of the first and second partial door panels is also simultaneously moved toward the closed state manually by an operator closing either the first partial door panel or the second partial door panel, wherein the first and second partial door panels are simultaneously transitioned to the open state via a first spring motor and a second spring motor, respectively, and wherein the first and second spring motors are operably coupled to each other to synchronize movement toward the closed state when manually moved to the closed state.

2. The door assembly of claim 1, wherein the first and second partial door panels are each supported from above by an overhead wheel carrier assembly and below by an inverted slide assembly.

3. The door assembly of claim 2, wherein the inverted slide assembly comprises an inverted U shaped channel disposed at a bottom portion of a respective one of the first and second partial door panels, and a track slider disposed below the door assembly to extend upward to slidably engage the inverted U shaped track as the respective one of the first and second partial door panels slides between the open state and the closed state.

4. The door assembly of claim 3, wherein the overhead wheel carrier assembly is operably coupled to the biasing assembly and one or more wheels of the overhead wheel carrier assembly are operably coupled to a track or bar to enable the overhead wheel carrier assembly to carry the respective one of the first and second partial door panels between the open and closed state.

5. The door assembly of claim 4, wherein the overhead wheel carrier assembly is disposed in an overhead support assembly disposed proximate an upper frame member of the door assembly.

6. The door assembly of claim 4, wherein the biasing assembly comprises a spring motor and a linking member operably coupling the spring motor to the one or more wheels to pull the one or more wheels toward the open state.

7. The door assembly of claim 1, wherein a lock assembly retains the first and second partial door panels proximate to each other against a biasing force of the biasing assembly in the closed state.

8. The door assembly of claim 1, wherein the first and second partial door panels, respectively, are spaced apart from, and not connected to, the first and second sidelites such that support of the first and second partial door panels is independent of the first and second sidelites.

9. The door assembly of claim 1, wherein the first and second partial door panels are supported for sliding in the third plane only by support components that are also disposed in the third plane.

10. The door assembly of claim 1, wherein the first and second partial door panels are each substantially C-shaped.

11. The door assembly of claim 10, wherein the first and second partial door panels each include a lower extension portion and an upper extension portion disposed opposite a gap portion that forms a service window when the first and second partial door panels are in the closed state.

12. The door assembly of claim 11, wherein a lock assembly retains the first and second partial door panels proximate to each other against a biasing force of the biasing assembly in the closed state, and wherein the lock assembly is disposed at a portion of the first partial door panel that faces a corresponding portion of the second partial door panel to engage the first and second partial door panels to each other.

13. The door assembly of claim 11, wherein a stainless steel cap is disposed at a top portion of the lower extension portion of each of the first and second partial door panels.

14. The door assembly of claim 11, wherein a handle is disposed at an interior side of each of the first and second partial door panels, and wherein the handle extends into a space formed between the first and second partial door panels and the first and second sidelites, respectively.

15. The door assembly of claim 1, wherein the first and second sliding panels are automatically operable to transition from the closed position to the open position responsive to a trigger signal from a sensor assembly.

16. The door assembly of claim 15, wherein the sensor assembly comprises a light curtain sensor disposed above the door opening to provide the trigger signal responsive to detecting an object approaching or in the door opening.

17. The door assembly of claim 15, wherein the sensor assembly comprises a set of vertical light sensors proximate to opposite lateral sides of a top portion of the door opening, the vertical light sensors providing a beam directed downward, the vertical light sensors generating the trigger signal responsive to interruption of the beam at any height between the vertical light sensors and a base upon which the door assembly is disposed.

18. The door assembly of claim 1, wherein a width of the first and second sidelites is approximately equal to a width of each of the first and second sliding panels and the first and second partial door panels.

* * * * *